United States Patent [19]

Gfeller et al.

[11] Patent Number: 5,271,075
[45] Date of Patent: Dec. 14, 1993

[54] FIBER OPTIC SWITCH WITH REMOTE OPTICAL POWERING

[75] Inventors: Fritz Gfeller, Rueschlikon; Peter L. Heinzmann, Windlach; Oliver Martin, Adliswil; Johann R. Mueller, Langnau am Albis, all of Switzerland

[73] Assignee: International Business Machines Corporation, Armonk, N.Y.

[21] Appl. No.: 852,583

[22] Filed: Mar. 17, 1992

[30] Foreign Application Priority Data

Mar. 25, 1991 [EP] European Pat. Off. ........ 91810215.3

[51] Int. Cl.[5] .............................................. G02B 6/10
[52] U.S. Cl. .......................................... 385/20; 385/24
[58] Field of Search ................................... 385/20-24; 359/127, 173

[56] References Cited

U.S. PATENT DOCUMENTS

| | | | |
|---|---|---|---|
| 4,148,558 | 4/1979 | Schuck | 385/24 |
| 4,304,460 | 12/1981 | Tanaka et al. | 385/24 |
| 4,366,565 | 12/1982 | Herskowitz | 385/24 X |
| 4,867,517 | 9/1989 | Rawson | 385/24 |
| 5,058,101 | 10/1991 | Albanese et al. | 385/24 X |

OTHER PUBLICATIONS

"Optical Bypass Switch For Fiber-Optic Data Bus System" by Nunoshita et al. Applied Optics, vol. 19, No. 15, Aug. 1, 1980, pp. 2574-2577.
Palounek, L. C. "Nematic Local Area Network Concentrator Switch", IBM Technical Disclosure Bulletin, vol. 26, No. 2, Jul. 1983, pp. 790-791.
Miki, Tetsuya, et al. "Viabilities of the Wavelength-Division-Multiplexing Transmission System Over an Optical Fiber Cable", IEEE Transactions on Communications, vol. 26, No. 7, Jul. 1978, pp. 1082-1087.

Primary Examiner—Akm E. Ullah
Attorney, Agent, or Firm—Philip J. Feig

[57] ABSTRACT

This invention relates to a remotely optically powered fiber optic switch, e.g. in a fiber optic network, and a GRIN-rod (Graded-Refractive-Index-rod) lens with integrated planar mirror as a switching element, in particular suited for fiber optic switches. A distribution panel, in which the switching element, a wavelength-division demultiplexer, a light-into-current converter, and an actuator for the switching element are situated, is remotely optically powered from a station in the network. Part of this station is a laser diode which feeds a powering lightwave via a wavelength-division multiplexer into an optical fiber interconnecting the station with the distribution panel, which fiber can also be used for data transmission. The light-into-current converter receives the powering lightwave and generates an electric current for driving the actuator and moving the switching element. A GRIN-rod lens with integrated planar mirror serves as switching element by rotating it in a ferrule and establishing different light paths depending on the position of the integrated mirror with respect to lightwaves optically coupled to the end facets of the GRIN-rod.

25 Claims, 7 Drawing Sheets

FIG.5A
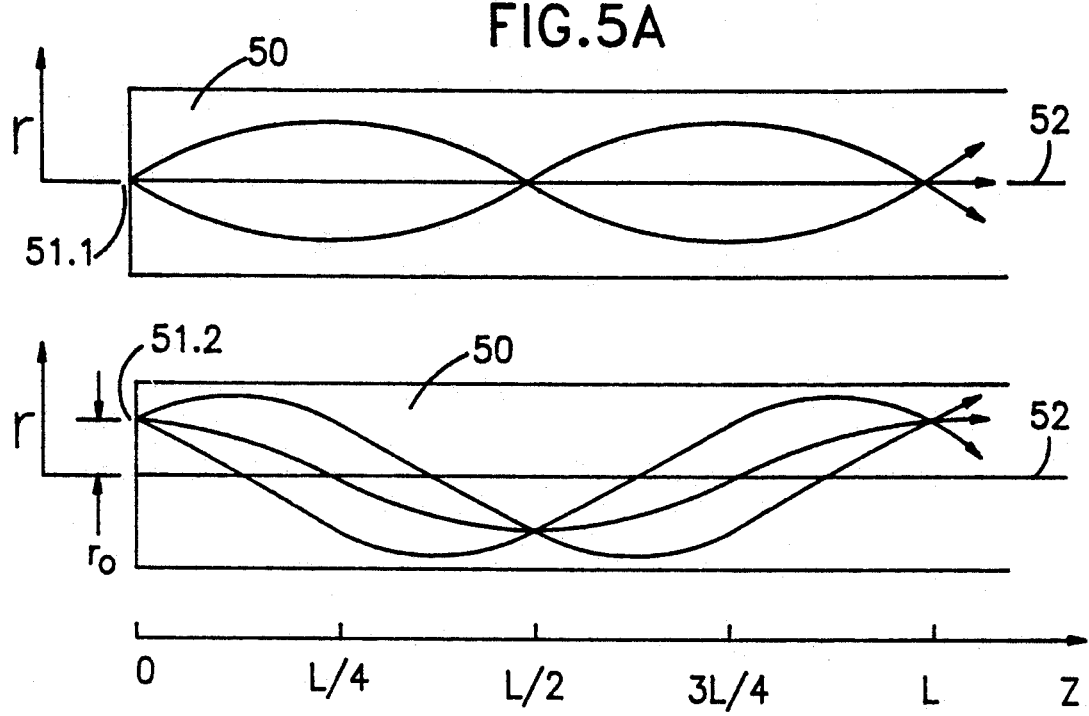
FIG.5B
FIG.6A
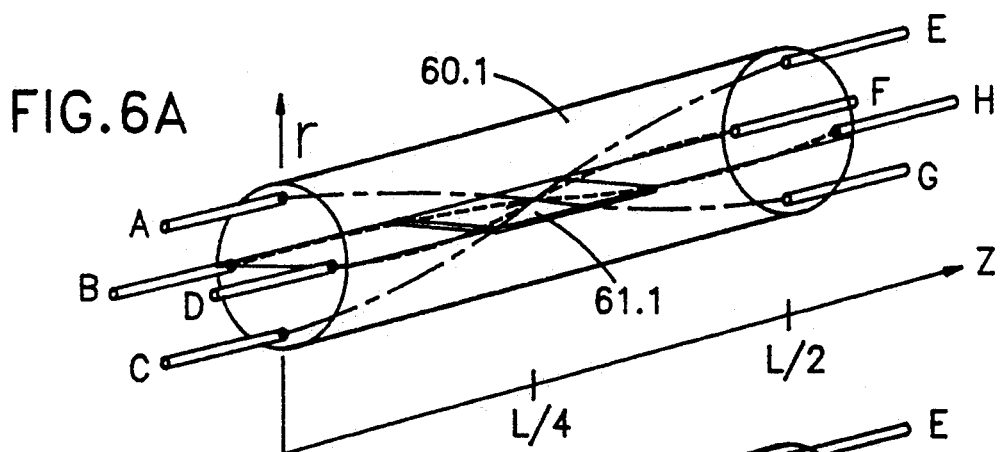
FIG.6B
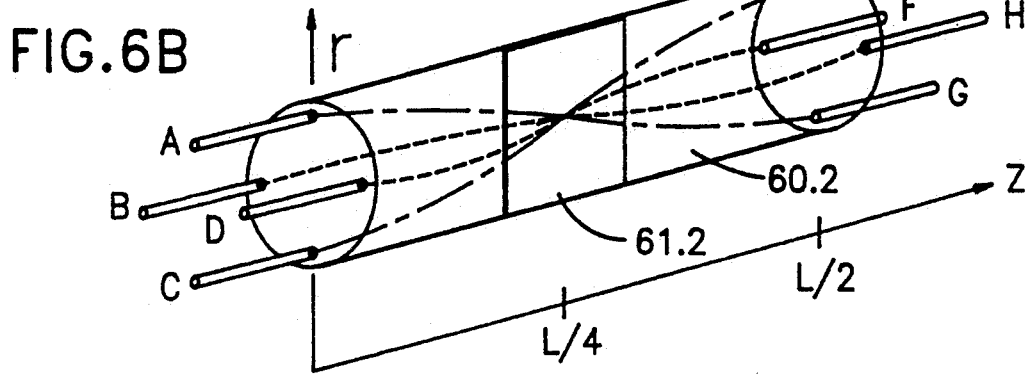

FIG.10D
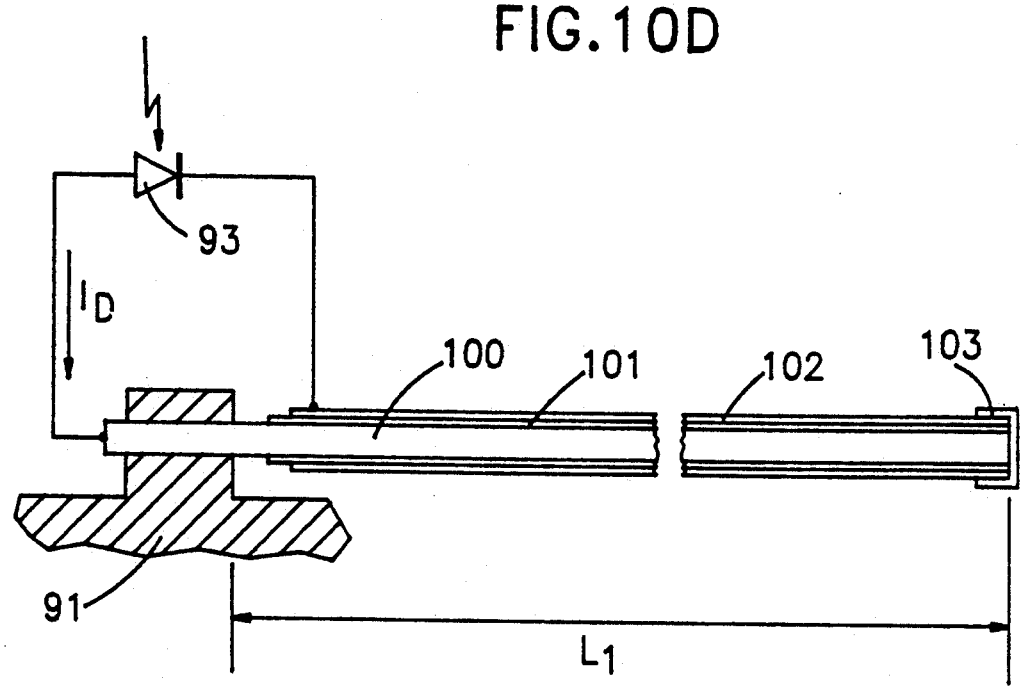
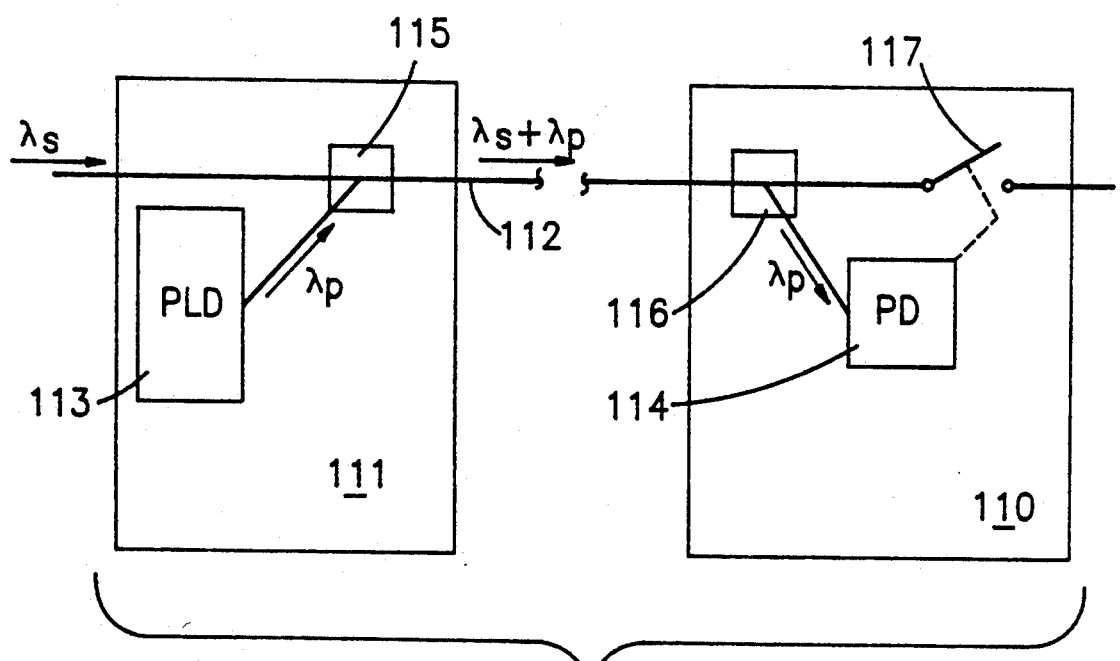
FIG.11

FIBER OPTIC SWITCH WITH REMOTE OPTICAL POWERING

TECHNICAL FIELD

The invention relates to fiber optic switches with remote optical powering for fiber networks and other optical systems. In the present invention the same optical fibers are used for the transmission of data and for the remote optical powering of these switches. For the realization of complicated switching functions a GRIN-rod lens (Graded Refractive Index rod) switching element with integrated planar mirror is disclosed.

BACKGROUND OF THE INVENTION

Optical systems and circuits for data communication, optical recording and computing, optical measuring instruments and medical applications become more and more important. Bandwidths of different optical fibers are used in these systems and circuits. Since optical fibers have the attractive advantage of not only large transmission capacity but lack of electromagnetic interferences and ground loop problems, fiber-optic technologies are almost ideally suited for the previously mentioned technical fields.

For the control and operation of optical fiber networks and other fiber applications different optical switches are necessary for disconnecting fiber links, for switching from one link to another or for multiplexing and demultiplexing. Most of the applications of switches have to be very reliable and should have only low losses.

The following sections relate mainly to fiber optic networks, e.g. LANs (Local Area Network), and switches for the same. In FIG. 1 a typical LAN is schematically shown. This LAN consists of an optical fiber ring 12 to which stations (e.g. PCs, Hosts, Routers, Concentrators) 10.1–10.8 are connected via distribution panels 13.1–13.8. The stations and distribution panels may be connected to one or two optical paths (rings or buses) i.e. by two fibers (single-attach) or four fibers (dual-attach). The distribution panels 13.1–13.9 of the shown application example consist mainly of bypass switches. A detailed sketch of a dual-attach configuration is shown in FIGS. 2A and 2B. The terminal 10.1 is connected via four optical fibers C, D, G, H to the passive distribution panel 13.1. If the terminal 10.1 is unpowered or in self-testing state it is not inserted into the network 12, as illustrated in FIG. 2A. It is in a bypass-and-wrap state. When the terminal 10.1 wants to insert into the network 12, the distribution panel 13.1 switches from bypass to insert state shown in FIG. 2B. This complex switching function can be realized by using four coupled change-over switches. A new and inventive GRIN-rod lens switching element with integrated planar mirror, which will be described below, can be used to realize these switching functions.

Different types of optical switches are known in the art. They are currently built with linear displacement switches where the fibers are pushed from one alignment to another by electro-magnetic or piezo-electric actuators. One example out of a great number of known publications relating to these switches is given by the article "Optical bypass switch for fiber-optic data bus systems", of M. Nunoshita et. al., Appl. Optics, Vol. 19, No. 15, pp. 2574–2577, August 1990. The switch described in this article has an iron piece with a pair of mirrors which can be attracted by a magnetizable electromagnet. In addition to the optical fibers it needs copper lines for the powering of the electromagnet. To realize switching functions similar to that described in context with FIG. 2A and FIG. 2B, two of the electromagnetic switches described in the article of M. Nunoshita are necessary. The combination of two electromagnetic switches is very bulky and needs separate copper lines for powering and control.

The inventive switch is constructed such that there is no need for external copper lines for the powering and control of the switch. It is remotely optically powered via the given fibers. Transmission of power by light is advantageous in most of the applications since there is no need for additional copper lines and since galvanic separation is achieved. The switches according to the present invention can be remotely powered and controlled using the data transmission fibers such that no additional fibers are required. The principle of remote optical powering is described in context with FIG. 3A and FIG. 3B. In these figures, a single-attach distribution panel 30 with fiber inputs/outputs A–D is illustrated. In the power-off and self-test phase, FIG. 3A, of a terminal 35 which is connected via fibers C and D to the distribution panel 30, the terminal 35 is not linked to the LAN 12. During this phase, the terminal 35 cannot receive or send data to the LAN 12. When the station wants to insert into the LAN 12, as illustrated in FIG. 3B, a powering laser diode 31 (PLD) emits a powering signal with wavelength $\lambda_p$ which is coupled into the fiber D via a wavelength-division multiplexer 32 (WDM). Another WDM 33, part of the distribution panel 30, feeds the powering signal to a converter 34 which converts the received powering signal into electric current. A switch being part of the distribution panel 30 is switched from one state to another by said current. In this state, the terminal 35 is linked to the LAN 12 and data signals with wavelength $\lambda_s$ are guided from and to the ring.

To ensure reliable operation of the switch, efficient power transmission and conversion is important. The optically driven power source 34, also called converter, has a limited output power. The power consumption of the actuators of the optical switches have to be adapted to the output power of the power source 34. A special SMA (Shape Memory Alloy) actuator which can be powered by a converter 34 is disclosed in context with one of the embodiments of the present invention.

In addition, a new and inventive GRIN-rod (graded-refractive-index-rod) lens with integrated planar mirror is disclosed hereinafter, which can be used for different applications in optical systems and in particular for switches according to fiber optic networks, e.g. 16 Mb/s-Token Rings or FDDI (Fiber Distributed Data Interface) or DQDB (Distributed Queue Dual Bus). GRIN-rod lenses have a number of features that make them particularly suitable for optical devices and for manipulating and processing signals in optical fiber communication systems. Several applications of GRIN-rod lenses are known in the art. To obtain a general view of GRIN-rods and state-of-the-art in this technical area, the following, chronologically ordered, articles are quoted. An analysis of the aberration of GRIN-rod lenses is published by W. J. Tomlinson in the article "Aberration of GRIN-rod lenses in multimode optical fibers", Appl. Optics, Vol. 19, No. 7, pp. 1117–1126, April 1980. Different designs of GRIN-rod lens devices, including connectors, attenuators, directional couplers, switches, isolators and wavelength-division multiplexers (WDMs) are reviewed by the same author in the publication "Applications of GRIN-rod lenses in optical fiber communication systems", Appl. Optics, Vol. 19, No. 7, pp. 1127–1138, April 1980. One example for a GRIN-rod lens employed in optical measuring instruments is given by the article "Rapid communication, A reflective optical sensing technique employing a GRIN rod lens", of S. D. Cusworth and J. M. Senior, J. Phys. E: Sci. Instrum., Vol. 20, pp. 102–103, 1987.

The nearest prior art to the GRIN-rod lens switching elements with integrated planar mirror, as hereinafter claimed and described, is given by a publication of F. Gfeller, "Bypass switch for optical fiber ring network", IBM Technical Disclosure Bulletin, Vol. 24, No. 3, pp. 1493–1495, August 1981. An optical GRIN-rod switch is described in this article which has to be electrically powered via separate copper lines. Electromagnets are employed for moving two liquids, mercury and a ferrofluid, through the optical path inside a GRIN-rod lens. With the current converted from a photodiode (order of 1 mA), as herein described, an electromagnet can hardly be used to produce a sufficient magnetic field strength to move the ferrofluid. (Relay magnets generally need 50 mA and more). However, these liquids might be moved by a SMA actuator pressing on a diaphragm or piston, but the force needed may well be higher than that provided by the current invention. It appears therefore very unlikely that the fluids can be moved by an SMA actuator with about 1 mW heating power.

The nearest prior art to fiber optic switches is given by a publication of P. Heinzmann and H. R. Mueller "Integrated fiber optical switching element", IBM Technical Disclosure Bulletin, Vol. 32, No. 10B, pp. 172–174, March 1990. In this article, an optical switching element is proposed comprising silicon microfabricated mechanical parts with integrated optical waveguides.

No prior art is known to the inventors relating to remotely optically powered switches and GRIN-rod lenses with integrated planar mirror, as described and claimed hereinafter.

SUMMARY OF THE INVENTION

It is a main object of the present invention to provide a remotely optically powered optical switch.

Another main object of the present invention is to provide an optical switch which can be galvanically separated from the station and is insensitive against electromagnetic fields.

Another object of the present invention is to provide an optical switching element for the realization of complex switching functions, e.g. for connecting and disconnecting dual-attach stations (terminals, host computers and other systems) to dual fiber networks.

Another main object of the present invention is to provide an implementation of a bypass/loop-back and insert switching system for connecting and disconnecting dual-attach stations to a dual fiber network.

Another object of the present invention is to provide an optical switching element which does not require time-consuming and expensive alignments and adjustments of the interconnections between fibers and switch.

Another object of the present invention is to provide a remotely optically powered switch which can be employed in bidirectional optical fiber systems as well.

A further object of the present invention is to provide an actuator which can be powered by an optically driven power source.

The invention as claimed is intended to meet these objects and to remedy the remaining deficiencies of known optical switches. In the inventive optical switch this is accomplished in that the switch is remotely optically powered using wavelength-division multiplexers, powering laser diodes, and light-into-current-converters. For very complicated switching functions, the conventionally used optical switches are replaced by a GRIN-rod lens switching element with integrated planar mirror. For switching, special actuators are disclosed using the shape memory effect.

The main advantage offered by the inventive remotely optically powered switch is that additional copper lines are not required for the powering, making the installation of these switches easier and cheaper. In addition, electromagnetic fields have no influence on the operation of these switches. The fundamental concept of the remote optical powering allows a galvanic separation of the stations on one hand and the network on the other hand. The realization of all optical fiber networks is possible using the inventive switches.

Further and still other objects of the present invention will become more clearly apparent when the following description is read in conjunction with the accompanying drawing.

BRIEF DESCRIPTION OF THE DRAWINGS

FIG. 5A is a cross-sectional view of a known GRIN-rod lens with point source along the longitudinal axis of the rod.

FIG. 5B is a cross-sectional view of a known GRIN-rod lens with point source shifted along the radius of the rod.

FIG. 6A is a perspective view of a GRIN-rod switching element with integrated planar mirror.

FIG. 6B is a perspective view of an alternative GRIN-rod switching element with integrated planar mirror.

FIG. 10D is a cross-sectional diagram of the actuator of the fourth embodiment.

FIG. 11 is a schematic top view of a fifth embodiment, showing a distribution panel and station.

DETAILED DESCRIPTION

The inventive remotely optically powered fiber optic switches comprises mainly of the following parts: wavelength-division multiplexer (WDM), powering laser diode (PLD), photo detector (PD), actuator (e.g. shape-memory alloy actuator), and switching element (e.g. GRIN-rod lens). These parts are described in greater detail below.

1. Wavelength-division multiplexer (WDM)

Figure 3A:
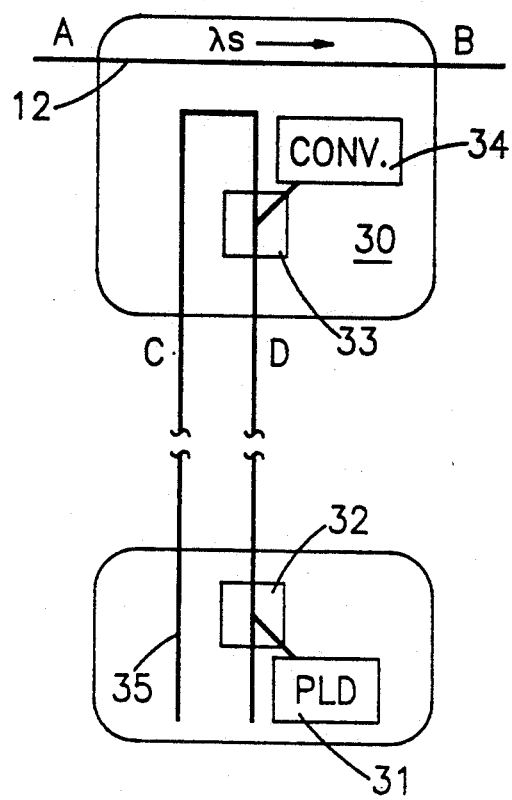
FIG. 3A is a schematic diagram of a remotely optically powered distribution panel in the bypass state.
Figure 3B:
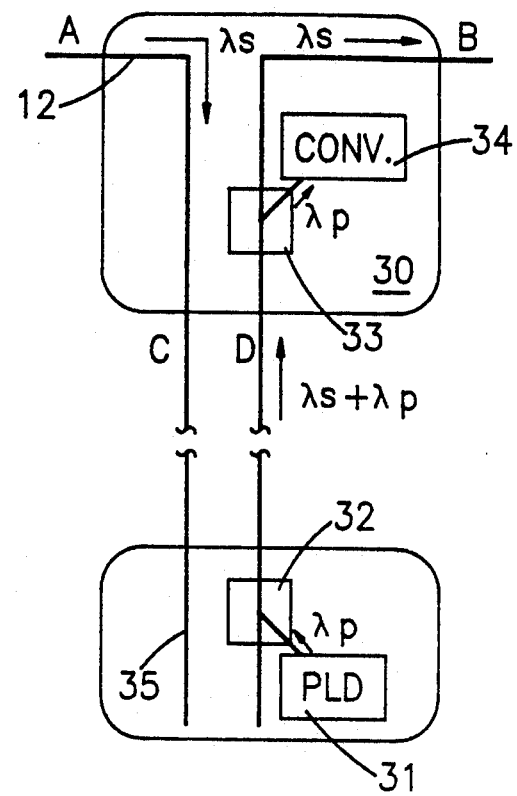
FIG. 3B is a schematic diagram of a remotely optically powered distribution panel in the loop-back state.

For multiplexing and demultiplexing of data signals and powering signals wavelength-division multiplexers 32,33 are employed, as schematically illustrated in FIG. 3A and FIG. 3B. By the employment of these WDMs it is possible to use one fiber for data transmission and powering simultaneously. The WDMs are essential devices for the remotely optically powering of the herein described switches. Different types of WDMs have been described in the literature and are known in the art such as prisms, gratings, interference filters, and active devices, i.e. multiple wavelength transmitters and receivers. Details relating to these devices and some general comments on WDM are found in the following articles: (1) T. Miki and H. Ishio, IEEE Trans. Communic., COM-26, p 1082, 1978, (2) W. J. Tomlinson, J. Opt. Soc. Am., Vol. 70, p. 1569A, 1980, and (3) J. Conradi, J. Opt. Soc. Am., Vol. 70, p. 1569A, 1980. In the paper "Review and status of wavelength-division multiplexing technology and its application", J. Lightwave Techn., Vol. LT-2, No. 4, pp. 448–463, August 1984, H. Ishio et. al. review state-of-the-art optical multi/demultiplexers and WDM system designs.

Figure 4:
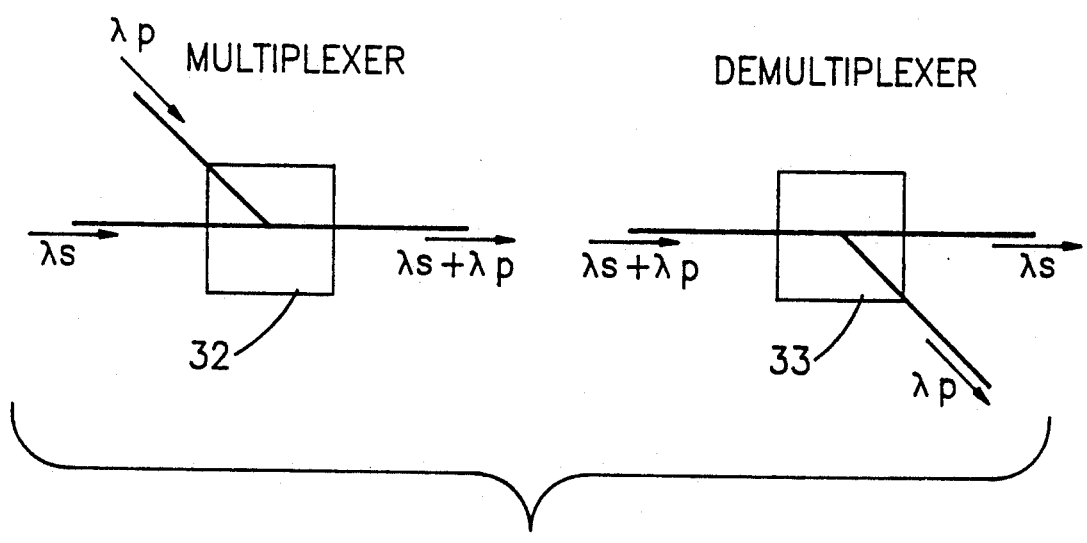
FIG. 4 is a schematic diagram of a wavelength-division multiplexer and a wavelength-division demultiplexer.

The present fiber optic switches rely on the use of passive optical wavelength multiplexers and demultiplexers designed to assure low insertion loss per wavelength channel, high isolation between these channels, high reliability, and small size. Of special interest for the present invention are "Integrated Optics on Glass" WDMs and (GRIN-rod) lens type WDMs. These and other types are described in the above cited article of H. Ishio et. al. The symbols of wavelength-division multiplexers 32 and demultiplexers 30, as used in the figures, are shown in FIG. 4.

Low losses of the employed WDMs are important because high efficient power transmission via the fibers interconnecting a multiplexer 32 with a demultiplexer 33 is required. The WDM employed in a remotely optically powered switch has to be adapted to the wavelength $\lambda_S$ of the data transmission via the fiber and to the wavelength $\lambda_P$ of the powering laser diode 31 (PLD).

2. Powering laser diode (PLD) and photo detector (PD)

The article "Efficient electric power transmission using photodiodes", S. Salamone, Lightwave, p. 12, November 1988 relates to the transmission of energy via an optical fiber. The receiving photo detector, also referred to as converter, has to be adapted to the wavelength $\lambda_P$ of the PLD such that it has good conversion efficiency at $\lambda_P$. To improve the efficiency of power transmission, suitable PLD arrays and converter arrays can be employed.

3. Switching element (GRIN-rod lens, micro switch)

For simple switches, e.g. a bypass switch for an optical fiber ring, a microfabricated switching element as disclosed in the Technical Disclosure Bulletin article of P. Heinzmann and H. R. Mueller "Integrated fiber optical switching element", IBM Technical Disclosure Bulletin, Vol. 32, No. 10B, pp. 172-174, March 1990, can be employed. This microfabricated rotatable switch allows establishing selectable connections between stationary fibers or waveguides. The microfabricated switching element can be driven with very low power because of its small size and low weight.

Figure 1:
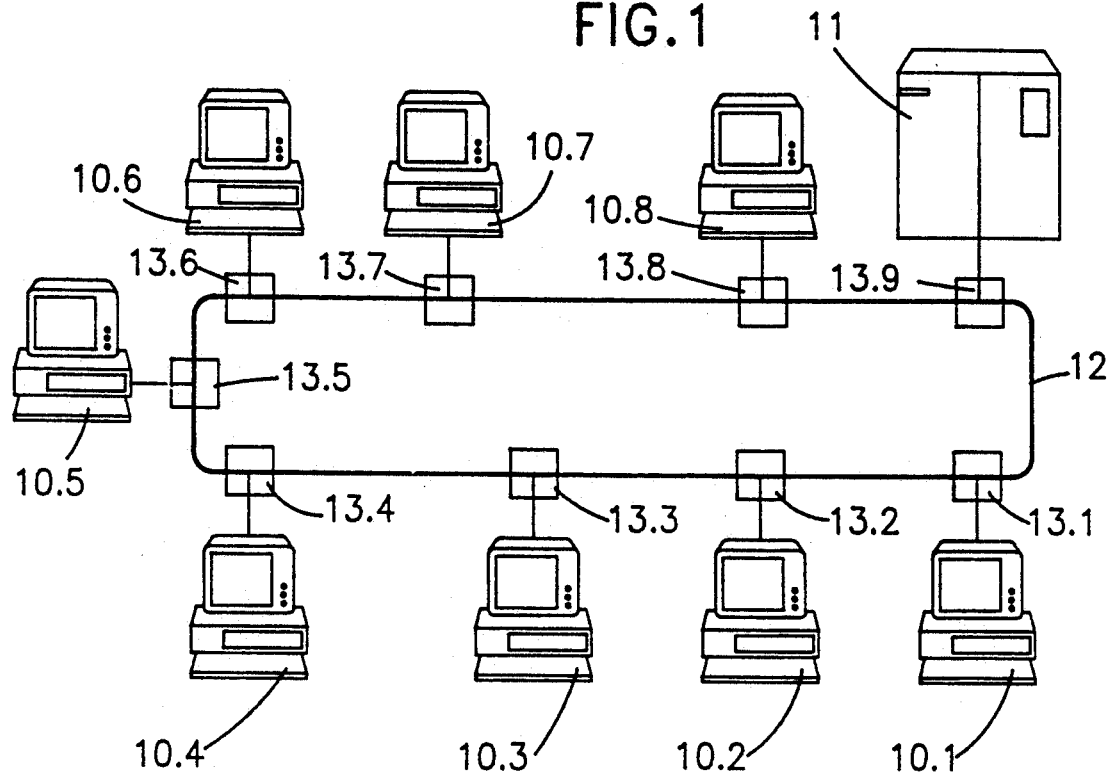
FIG. 1 is a schematic diagram of a LAN (Local Area Network) with several stations and a host computer.
Figures 2A, 2B:
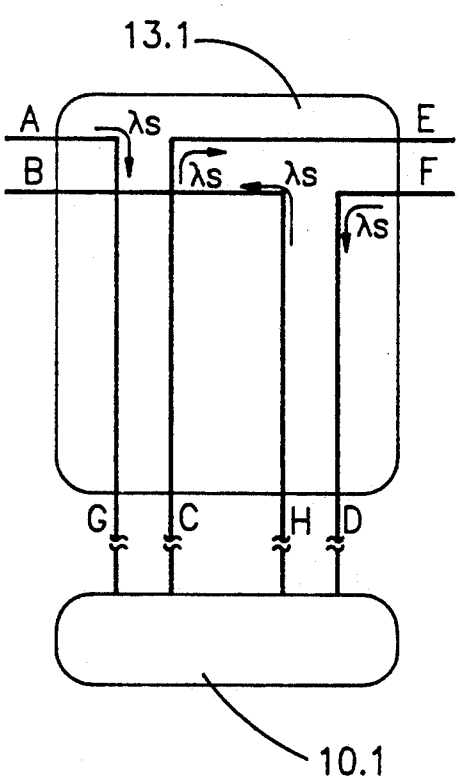
FIG. 2A is a schematic diagram of the LAN shown in FIG. 1, showing a distribution panel in the bypass state.
FIG. 2B is a schematic diagram of the LAN shown in FIG. 1, showing a distribution panel in the loop-back state.

For switches with complex switching functions or for parallel coupled throw-over switches, as illustrated in FIG. 2A and FIG. 2B, an inventive graded-refractive-index-rod lens (GRIN-rod lens) with integrated planar mirror is disclosed. This GRIN-rod lens is pivoted in a ferrule such that it can be moved by an actuator from one position to another.

In the following section a short description of a GRIN-rod lens 50, as known in the art, is given. It is illustrated in FIG. 5A and FIG. 5B. A GRIN-rod lens 50 comprising a cylinder of dielectric material with a refractive-index distribution which has a maximum along the longitudinal axis 52 of the rod and decreases approximately as the square of the radical distance. The index distribution n(r) is usually written in the form $$n(r) = n_a \left( 1 - \frac{A}{2} r^2 \right), \tag{1}$$

where $n_a$ is the design index along the longitudinal axis of the rod, A is a positive constant, and r is the radial distance from the rod longitudinal axis. In the paraxial approximation, it can easily be shown that in such a medium meridional rays will follow sinusoidal paths, as illustrated in FIG. 5A and FIG. 5B, and described by $$r(z) = r_0 \cos(\sqrt{A} \, z) + \frac{\hat{r}_0}{\sqrt{A}} \sin(\sqrt{A} \, z), \tag{2}$$

where $r_0$ is the initial radial position of the ray, and $\hat{r}_0$ is its initial slope (inside the lens). Note that all rays have the same period or pitch, which is usually designated by $L = 2\pi/\sqrt{A}$. FIGS. 5A and 5B show these ray paths for a point source 51.1, 51.2 (e.g. butt-coupled optical fiber) on-axis ($r_0 = 0$) and for an off-axis point, ($r_0 > 0$), respectively. For an object on the end of the lens, the lens forms an inverted image at $z = L/2$ and an erect image at $z = L$. At intermediate positions, $z = L/4$ and $z = 3L/4$, all rays from a given point are parallel, and thus one has collimated beams. The focusing properties of GRIN-rod lenses have been described in considerable detail in the article of F. P. Kapron, J. Opt. Soc. Am., Vol. 60, p. 1433, 1970, and in the article of W. J. Tomlinson "Aberrations of GRIN-rod lenses in multimode optical fiber devices", Appl. Opt., Vol. 19, No. 7, pp. 1117-1126, April 1980.

The GRIN-rod lens with integrated planar mirror according to the present invention is schematically shown in FIG. 6A and 6B. The core section of the rod is doped such that a parabolic refractive index profile is created, similar to the index profile described in Eq. (1). Four fibers A–D are optically coupled to the left end ($z=0$) of the GRIN-rod 60.1 as illustrated in FIG. 6A. A planar mirror 61.1 is integrated into the rod and is situated in the plane unfolded by the fibers B and D. The center of mirror 61.1 is at $z=L/4$. Four output fibers E–H are optically coupled to the right hand side of the GRIN-rod 60.1. An optical beam launched at the fiber A is periodically focused along the rod axis z. At the point $z=L/4$ it is reflected by the mirror 61.1 and coupled to output fiber E. By symmetry of the optical paths the beams of the input fibers A–D are refocused at the output fibers E–H. The optical path of fibers B and D are not affected by the mirror 61.1. The connectivity between these fibers is given by $$A \to E \quad B \to H \quad C \to G \quad D \to F.$$

In FIG. 6B a planar mirror 61.2 is integrated in the plane unfolded by the fibers A and C. The following connections are established $$A \to G \quad B \to F \quad C \to E \quad D \to H.$$

For applications requiring single mode fibers, positioning tolerances may require that the output fibers are multimode (larger core cross-section). However, the multimode fiber pigtails may be refocused to single mode fibers again, if necessary.

The key parts of some of the embodiments of the present invention are GRIN-rod lenses as described in context with FIGS. 6A and 6B which are pivoted in a ferrule. The input and output fibers are fixed in the ferrule which serves as an accurate bearing of the GRIN-rod lens and provides alignment of the fibers. Small gaps exist between both end facets of the rod and the ferrule with fibers. Rotating the GRIN-rod with integrated planar mirror by 90 degrees provides switching from the connectivity shown in FIG. 6A to the connectivity shown in FIG. 6B.

4. Actuators

For the above described GRIN-rod with mirror a special Shape-Memory-Alloy (SMA) actuator is hereinafter disclosed. The actuator mechanism is based on a new technology using the Shape-Memory-Effect (SME) of Ti-Ni or Cu-Zn-Al alloys. A description of the effect is given in the article "A new design method of servo-actuators based on the shape-memory-effect", of S. Hirose et. al., Dept. of Physical Engineering, Tokyo Institute of Technology, Tokyo, Japan, pp. 339–349.

Depending on the temperature, SMAs have two phases (austenite and martensite). The alloy, in our embodiments simple wires, can be given a distinct geometric shape in each phase. Switching the actuator from its initial shape (austenite phase) to its intermediate shape (martensite phase) is simply effected by raising the temperature of the wire. The initial shape is obtained again by lowering the temperature. The SME allows fast transition from one phase to the other and shape reversal has been demonstrated to be above 1 million cycles without fatigue. Depending on the alloy composition, the transition temperature can be chosen in the range of $-200$ to $+150$ degree C, thus allowing a considerable margin in operational temperatures. In the literature, see the above mentioned article of S. Hirose, heating of the SMA is usually accomplished by passing an electric current through the material, herein refered to as resistive heating.

Figure 7:
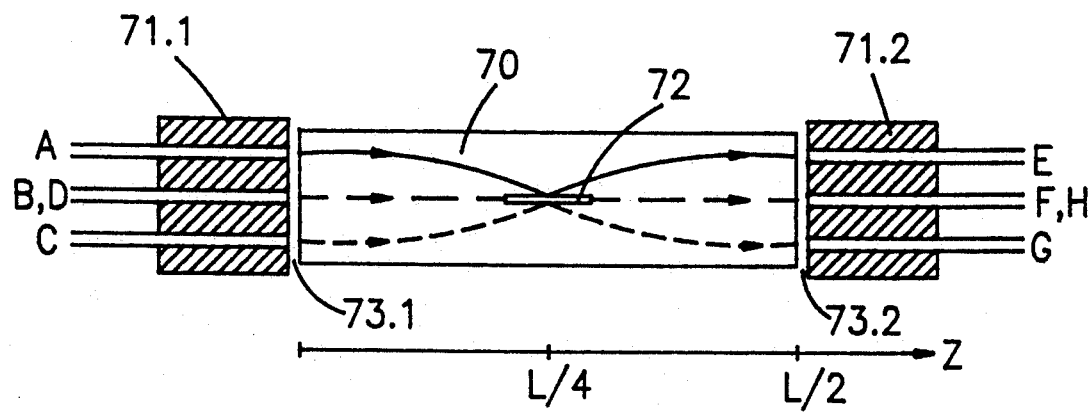
FIG. 7 is a cross-sectional view of a first embodiment showing a GRIN-rod switching element with integrated planar mirror.

In a first embodiment of the present invention there is a GRIN-rod lens 70 based on the GRIN-rod lens as described in section 3 above. It is illustrated in FIG. 7. The GRIN-rod lens 70 is formed by doping the core section such that a parabolic refractive index profile is created. The rod 70 has the length $L/2$ and the optical paths launched from one fiber (e.g. fiber A) are parallel at $z=L/4$. To perform a switching action, the GRIN-rod lens 70 is provided with an integrated planar mirror 72 located in the center of the lens at $z=L/4$. The input fibers A–D are fixed in a mounting plate 71.1 and the fibers E–H are fixed in another mounting plate 71.2. The fibers are fixed in these plates 71.1 and 71.2 such that a small gaps 73.1 and 73.2 exist between the respective plates and the oppositely disposed end of GRIN-rod 70. In the shown position of the GRIN-rod 70, the following connectivity is given $$A \to E \quad B \to H \quad C \to G \quad D \to F.$$

Rotating the GRIN-rod 70 to 90 degrees (not shown) provides the fiber connectivity required for a link reconfiguration. In this position the fibers are connected as given by $$A \to G \quad B \to F \quad C \to E \quad D \to H.$$

The GRIN-rod lens 70 is fabricated by doping a glass rod as mentioned above and evaporating a thin aluminium film on a half section of the rod. The second half section is cemented on top of the first one with an index-mached optical cement or epoxy. The fibers A–H are fixed and alligned in the mounting plates 71.1 and 71.2 by cementing them into predefined slots.

Figure 8:
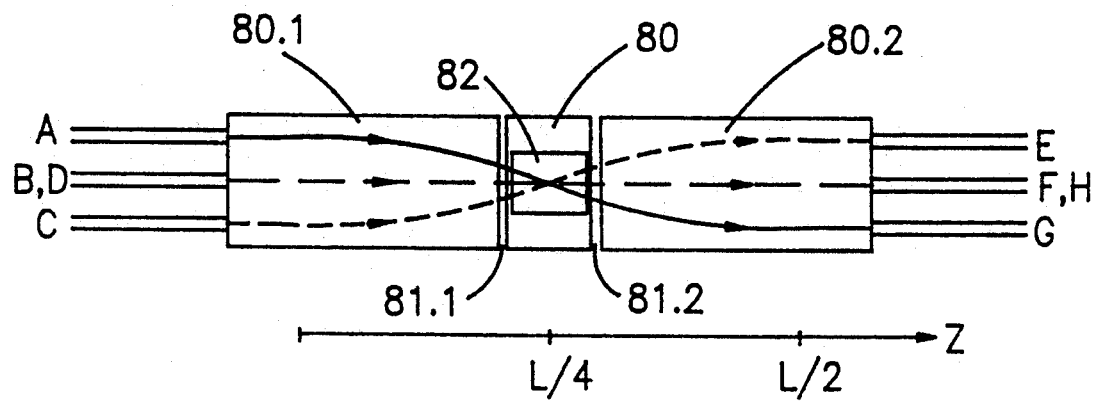
FIG. 8 is a cross-sectional view of a second embodiment showing another GRIN-rod switching element with integrated planar mirror.

In a second embodiment there is a GRIN-rod lens 80 with integrated planar mirror 82 as illustrated in FIG. 8. A similar GRIN-rod as that described in conjunction with the first embodiment is used. The GRIN-rod 80 is shown in a position rotated by 90 degrees in comparison to the GRIN-rod 70 in FIG. 7. The end sections 80.1 and 80.2 are separated from the middle part of the rod 80 with integrated mirror 82 by sawing them off. Small gaps 81.1, 81.2 exist between the rod 80 and its end sections 80.1, 80.2. The facets of the end sections 80.1, 80.2, and the facets of the rod 80 are coated with an antireflection coating to reduce the surface reflection losses. The fibers A–H are butt-coupled to the planar facets of the rod sections 80.1, 80.2 which are perpendicular to the longitudinal axis of the rod. The optical paths of light fed via fibers A–D to the first rod section 80.1 are similar to that of a solid GRIN-rod without gaps. The beams emitted by the fibers are parallel at $z=L/4$, respectively, and refocused to the output fibers E–H at $z=L/2$. By the employment of the planar mirror 82 the beams of fibers A and C are not affected in this position such that fiber A is connected to fiber G and fiber C to fiber E. The connectivity in this position is given by $$A \to G \quad B \to F \quad C \to E \quad D \to H.$$

Rotating the GRIN-rod by 90 degrees (not shown) provides switching from these connections to the connections

A→G B→F C→E D→H.

One advantage of this embodiment is that the middle part of the rod 80 has a reduced size and weight in comparison with the GRIN-rod 70, shown in FIG. 7. The required forces for rotating rod 80 are reduced.

Figure 9:
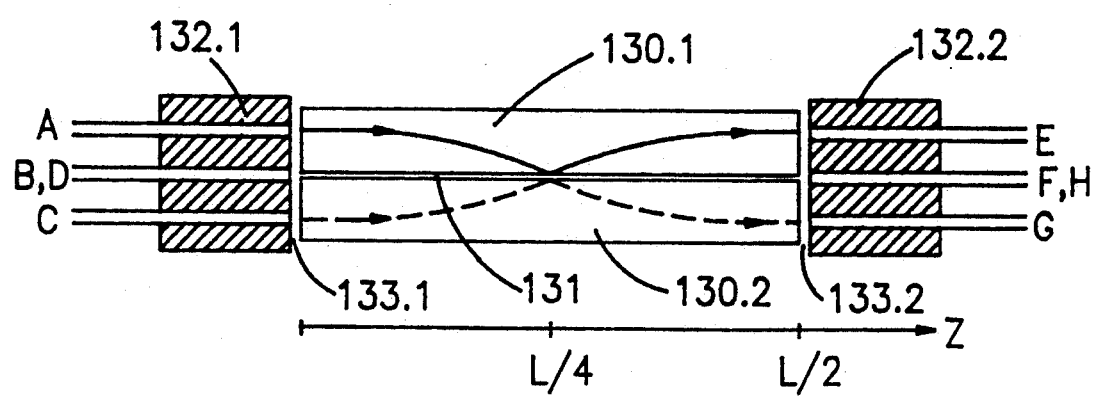
FIG. 9 is a cross-sectional view of a third embodiment showing a GRIN-rod switching element with a gap serving as planar mirror.

In a third embodiment of the present invention there is a GRIN-rod lens consisting of two parts 130.1 and 130.2. The upper half part 130.1 is separated from the lower half part 130.2 by a small gap 131. The surfaces of these parts are coated with an antireflection coating to reduce surface losses. The alignment of the fibers A–H is similar to that described in contex with the first embodiment. The fibers are fixed in mounting plates 132.1 and 132.2 such that a gaps 133.1, 133.2 exist between the fibers and the two-part rod 130.1, 130.2. The parts of the rod are separated by distance pieces not shown in FIG. 9. The mirror of the first and second embodiments is replaced by the rod-air interfaces at which total reflection takes place. The gap has to be thicker than the wavelength of the lightwave which has to be reflected.

Figure 10A:
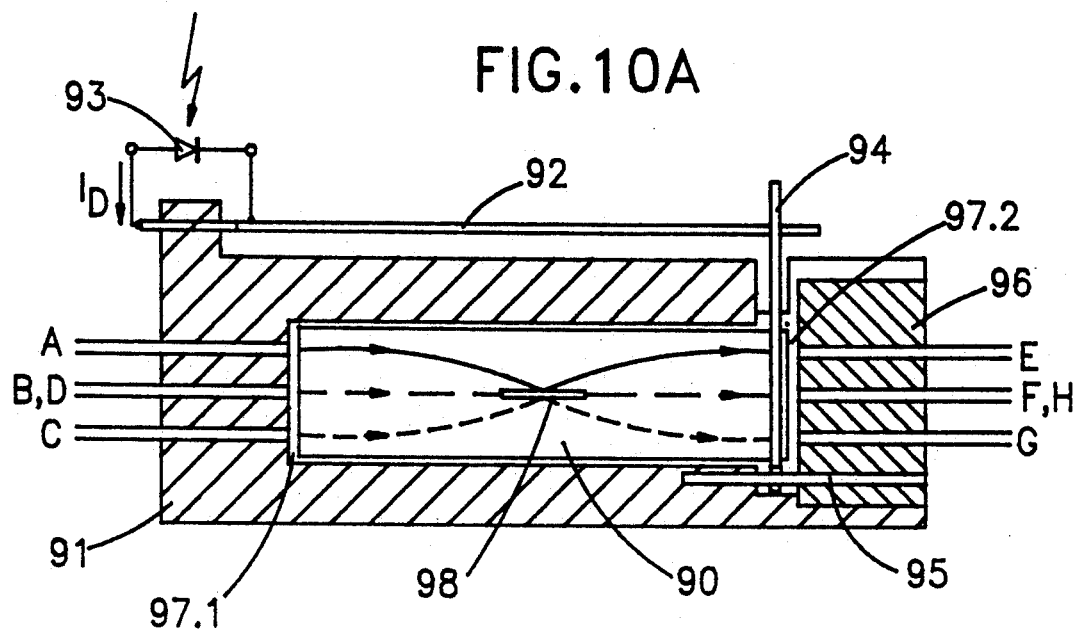
FIG. 10A is a cross-sectional view of a fourth embodiment showing a GRIN-rod switching element with actuator, pivoted in a ferrule.

In a fourth embodiment of the present invention there is a switching element comprising a GRIN-rod lens 90, a ferrule 91, and an actuator 92. The fourth embodiment is described with references to FIGS. 10A–10D. A GRIN-rod lens 90, similar to the GRIN-rod 70 described as first embodiment, is pivoted in a ferrule 91. This ferrule 91 serves as an accurate bearing on the GRIN-rod 90 and provides alignment of fibers A–D. The fibers E–H are fixed in a fiber alignment element 96 which is aligned to the ferrule 91 by an alignment pin 95. Small gaps 97.1, 97.2 exist between the ends of the fibers A–H and the GRIN-rod 90. A planar mirror 98 is integrated at the center of the GRIN-rod 90. A SMA actuator 92 is fixed at the ferrule 91. It is connected via a flexible lever 94 to the GRIN-rod 90 and is capable of rotating the GRIN-rod switching element 90 between positions I and II. As illustrated in the top view of the third embodiment, FIG. 10B, and in the cross-section FIG. 10C, the GRIN-rod switching element 90 rotates in its bearing 91 when the actuator 92 and lever 94 are moved from one position to another position. The photo diode 93 converts light into a photo current $I_D$ which drives the actuator 92. By resistive heating the actuator changes from the austenite phase (position I) to the martensite phase (position II). For this application the following approach had to be found since the electrical resistance of the SMA wire 100 is much too small to extract the required electrical power (order of 1 mW) from the photo diode 93. As illustrated in FIG. 10D, the SMA wire 100 is coated with an insulating film 101 and a resistive film 102 providing the desired resistance of the configuration such that maximum power can be extracted from the photo diode 93. The photo current $I_D$ is fed to the SMA wire 100 and flows through the wire, a metal bridge 103 and the serial resistance formed by the resistive layer 102, thus providing uniform heating of the SMA.

The SMA actuator 100 has a diameter of 0.06 mm and a length of cantilever of 10 mm. Based on elastic bending of the cantilever the resulting deflecting force is approximately 450 mg, i.e. 10 times greater than the weight of the GRIN-rod switching element 90. These calculations are based on the Young's modulus $E=700$ KBar (SMA data). With 1 mW of electrical power from the photodiode 93, the temperature rise of the SMA actuator 100 is still approximately 130 degree C., i.e. sufficient for a phase transition to occur with a margin for various ambient temperatures.

Figure 10B:
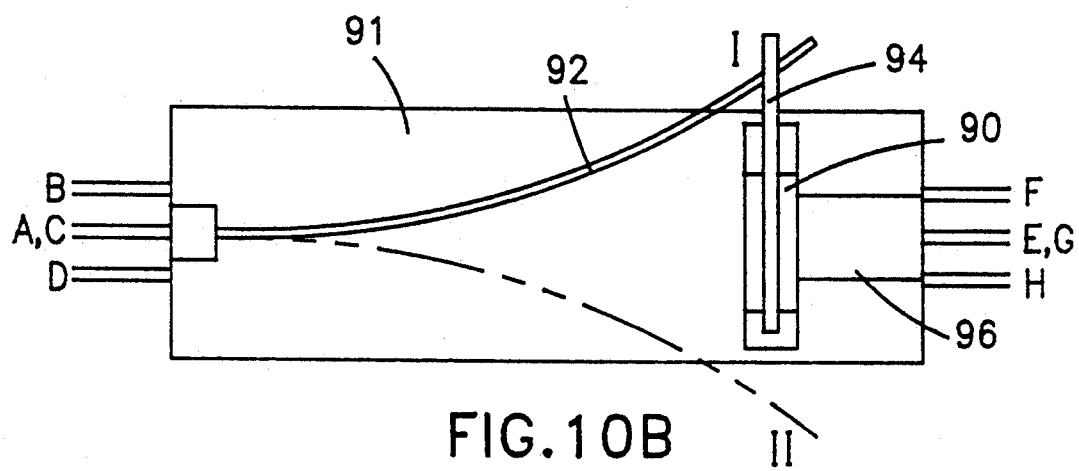
FIG. 10B is a top view of the ferrule with actuator of the fourth embodiment.
Figure 10C:
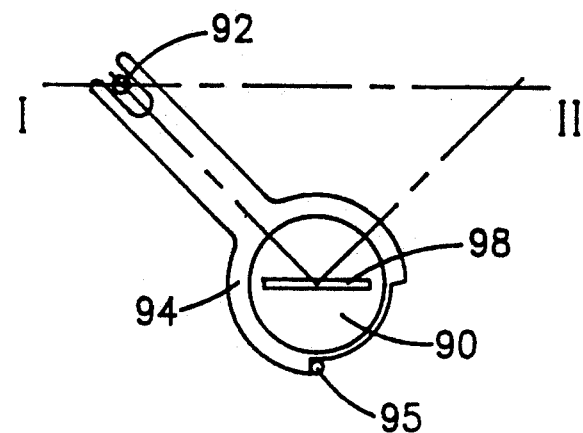
FIG. 10C is an illustration of the actuating mechanism of the fourth embodiment

To prevent excessive heat losses of the SMA elements 100–103 due to convective heat transfer to the surrounding air, the entire SMA element including the rotary switching element is placed in a vacuum environment. FIGS. 10A and 10B show schematically the actuator/switching element enclosed in a hermetically sealed and evacuated package with ports for the optical fibers A–H and photodiode wires. Most electronic packages (ICs) are hermetically sealed or filled with an inert gas (e.g. laser diodes), or evacuated (e.g. Reed relays, electron tubes). This additional requirement is therefore considered as state of the art.

In a fifth embodiment of the invention there is a remotely optically powered switch as shown in FIG. 11. It consists of a station 111 comprising a powering laser diode 113 (PLD) and a wavelength-division multiplexer 115. The station 111 is inserted into a single fiber net 112 on which data with wavelength $\lambda_s$ are transmitted. The second part of the switch is a distribution panel 110 being separated from the station 111. The distribution panel 110 consists of a wavelength-division demultiplexer 116, a switch 117, and a photo diode 114. When the station 111 wants to disconnect the data transmission via fiber 112 it remotely optically drives the switch 117 by feeding a powering lightwave with wavelength $\lambda_p$, emitted from the PLD 113, into the fiber 112. At the distribution panel 110, the wavelength-division demultiplexer 116 separates the powering lightwave from the other lightwaves propagating in the fiber 112, and feeds it to the photo diode 114. The photo diode 114 converts the light into electric current and drives the switch 117.

Different other embodiments are conceivable based on the fifth embodiment. The switch 117 can be replaced by one or more throw-over switches, and the station and distribution panel can be adapted to a dual fiber net. One example of an application is a fiber network into which a distribution panel with throw-over switch is inserted. All stations connected to this network have their own PLD and WDM such that each station has the possibility to drive the switch situated in the distribution panel by feeding a powering lightwave with wavelength $\lambda_p$ into the network.

The concept of remote optical powering can be used for networks with bidirectional data transmission too. By suitable configuration of WDMs it is possible to drive a switch from both sides of a fiber ring. By connecting logic gates to the output of one or more photo diodes it is possible to create a remotely optically driven switch whose switch position depends on the state of several stations.

Figure 12A:
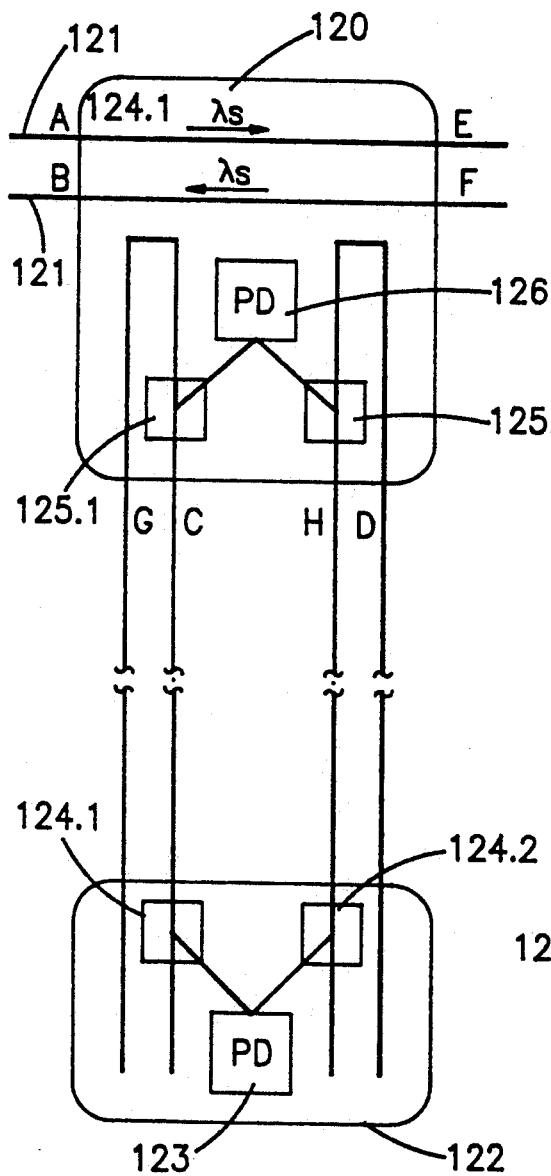
FIG. 12A is a schematic top view of a sixth embodiment, showing a distribution panel and station in the bypass-state.
Figure 12B:
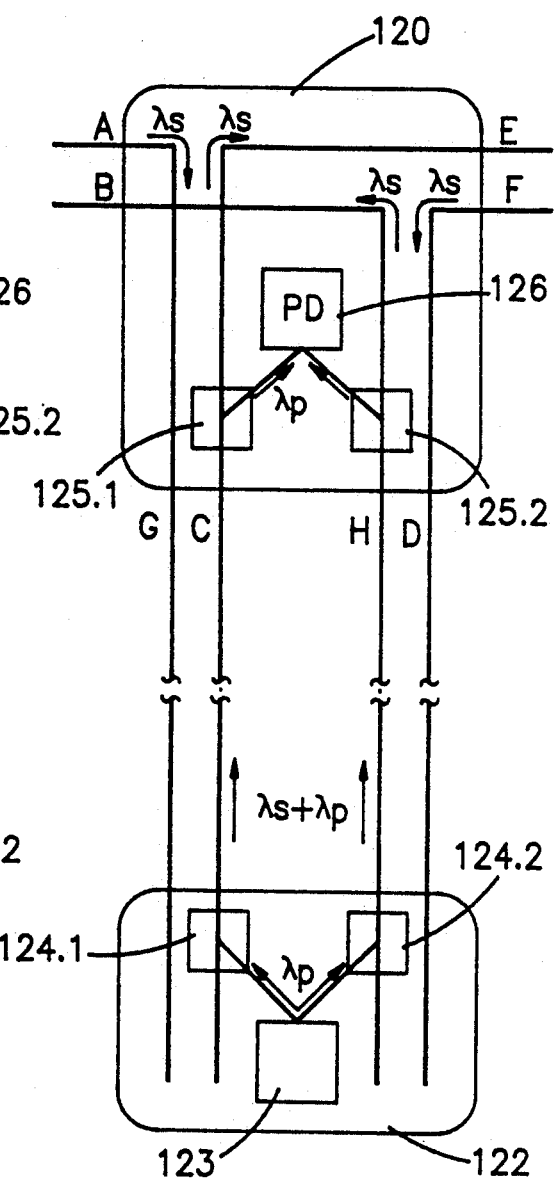
FIG. 12B is a schematic top view of the sixth embodiment, showing a distribution panel and station in the insert-state.

In a sixth embodiment of this invention there is a remotely optically powered distribution panel 120 with a GRIN-rod lens switching element having an integrated planar mirror as a part of an optical dual-line fiber network 111 as shown in FIGS. 12A and 12B. The GRIN-rod lens switching element with actuator is not illustrated in these schematic figures. The distribution panel 120 is a passive optical switch which is powered and controlled by the corresponding terminal, or PC, hereinafter refered to as station 122. The distribution panel 120 has two switching positions as illustrated in FIG. 12A and FIG. 12B. In the bypass state, FIG. 12A, the station 122 is not connected to the fiber network 121, consisting of the fibers A and B. In this state the powering laser diode 123 (PLD) is not emitting light. When the station 122 wants to insert into the fiber ring 121, insert state, the PLD is powered such that it emits light with wavelength $\lambda_p$, as illustrated in FIG. 12B. This lightwave is fed via wavelength-division multiplexers 124.1, 124.2 (WDM) to the interconnection fibers C, D, G, H and guided to the distribution panel 120. In the panel 120, WDMs 125.1, 125.2 separate the powering lightwave from other lightwaves circulating in the fibers and feeds it to a photo diode 126 (PD). This photo diode 126 converts the received light into an electric current which drives a SMA actuator (not shown). This current heats the SMA actuator and switches a GRIN-rod lens switching element with integrated planar mirror from the first position (bypass state) to the second position (insert state), as described in context with the fourth embodiment. In this second position the connectivity of the fibers is given by

A→G B→F C→E D→H.

If there is a power failure or any other problem in the station 122 it is immediately disconnected caused by the temperature of the SMA actuator which lowers such that the actuator switches back to the first position (safety disconnector).

The wavelength-division multiplexer/demultiplexer employed in this embodiment are manufactured by an integrated optics on glass technology utilizing photolithographic and ion exchange techniques. The benefits of the "Integrated Optics on Glass" WDMs are low loss, low crosstalk, and small size. These and other kinds of WDMs are commercially available.

While there has been described and illustrated a fiber optic switch with remote optical powering and several modifications and variations thereof, it will be apparent to those skilled in the art that further modifications and variations may be made without deviating from the spirit and broad principle of the invention which shall be limited solely by the scope of the claims appended hereto.

What is claimed is:

1. A fiber optic switch with remote optical powering for connecting and disconnecting links between fibers, including a switching element, an actuator, and a powering system, comprising:
   light-into-current converter means;
   optical powering means; and
   at least one optical interconnection fiber, disposed such that a lightwave emitted by said optical powering means, travels via said optical interconnection fiber to said light-into-current converter means whereby said light-into-current converter means output current drives said actuator which, in turn, switches said switching element.

2. A fiber optic switch as set forth in claim 1, wherein said
   optical powering means is remotely disposed from said light-into-current converter means and optically coupled to said light-into-current converter means via said interconnection fiber.

3. A fiber optic switch as set forth in claim 2, wherein said switching element is a micromechanical switch.

4. A fiber optic switch as set forth in claim 3, wherein said micromechanical switch comprises:
   a cylindrical rotor with integrated waveguide patterns said rotor being pivotable in a baseplate.
   said baseplate having an actuator for said rotor and serving as a bearing for said rotor and as optical coupling means between said fibers and said rotor, disposed such that different fiber links are established by rotation of said rotor by said actuator.

5. A fiber optic switch as set forth in claim 2, wherein said
   light-into-current converter means comprises wavelength-division demultiplexer means and a light-into-current converter, and said optical powering means comprises a laser source for emitting a powering lightwave with wavelength $\lambda_p$, and wavelength-division multiplexer means disposed such that said switch is powered by said powering lightwave fed, via said wavelength-division multiplexer means, to said interconnection fiber, propagating therethrough together with lightwaves used for data transmission, separated from the data transmission lightwaves by said wavelength-division demultiplexer means, and fed to said light-into-current converter, thus enabling simultaneous data transmission and powering of said switching element.

6. A fiber optic switch as set forth in claim 5, wherein said
   light-into-current converter is a photo diode and said laser source is a laser diode.

7. A fiber optic switch as set forth in claim 1, wherein said
   light-into-current converter means comprises wavelength-division demultiplexer means and a light-into-current converter, and said optical powering means comprises a laser source for emitting a powering lightwave with wavelength $\lambda_p$, and wavelength-division multiplexer means disposed such that said switch is powered by said powering lightwave fed, via said wavelength-division multiplexer means, to said interconnection fiber, propagating therethrough together with lightwaves used for data transmission, separated from the data transmission lightwaves by said wavelength-division demultiplexer means, and fed to said light-into-current converter, thus enabling simultaneous data transmission and powering of said switching element.

8. A fiber optic switch as set forth in claim 7, wherein said
   light-into-current converter is a photo diode and said laser source is a laser diode.

9. A fiber optic switch as set forth in claim 1, wherein said switching element comprises a Graded-Refractive-Index-rod (GRIN-rod) lens with integrated planar mirror.

10. A fiber optic switch as set forth in claim 9, wherein said
    GRIN-rod lens is pivoted in a ferrule, and has a refractive index distribution substantially equal to $n(r) = n_a(1 - Ar^2/2)$, wherein $n_a$ is the refractive index along the longitudinal axis of said GRIN-rod lens, A is a positive constant, and r is the radial distance from the longitudinal axis of said GRIN-rod lens (90), and a length $L_1 = \pi/\sqrt{A}$, wherein A is said positive constant, and
    has a first and a second end facet substantially perpendicular to its longitudinal axis.

11. A fiber optic switch as set forth in claim 10, wherein said
    GRIN-rod lens is optically coupled to fibers such that different links between said fibers are established by rotating said GRIN-rod lens with integrated planar mirror relative to the position of the fibers.

12. A fiber optic switch as set forth in claim 9, wherein a planar
mirror is integrated substantially at the center of the GRIN-rod lens at distance $L_1/2$, and is perpendicular to said first and second end facets and parallel to the longitudinal axis of the GRIN-rod lens.

13. A fiber optic switch as set forth in claim 12, wherein said
GRIN-rod lens is pivoted in a ferrule and optically coupled to fibers such that different links between said fibers are established by rotating said GRIN-rod lens with integrated planar mirror.

14. A fiber optic switch of claim 1, wherein said switching element is a micromechanical switch.

15. A fiber optic switch as set forth in claim 14, wherein said micromechanical switch comprises:
a cylindrical rotor with integrated waveguide patterns said rotor being pivotable in a baseplate,
said baseplate having an actuator for said rotor and serving as a bearing for said rotor and as optical coupling means between said fibers and said rotor, disposed such that different fiber links are established by rotation of said rotor by said actuator.

16. In a fiber optic network, a remotely optically powered bypass/insert optical switch for connecting or disconnecting a station to the network, comprising:
a distribution panel being insertable in said network, including a wavelength-division demultiplexer, a light-into-current converter, a switching element, and an actuator for said switching element,
at least one interconnection fiber, and
powering means disposed at a station, comprising a powering laser diode and a wavelength-division multiplexer, coupled such that said powering means is connected via said at least one interconnection fiber to said distribution panel for connecting and disconnecting fiber links,
whereby a powering lightwave is fed via said wavelength-division multiplexer and said interconnection fiber to said distribution panel where it is coupled via said wavelength-division demultiplexer to said light-into-current converter, and converted into electric current for driving said actuator.

17. A bypass/insert optical switch as set forth in claim 16, wherein said at least one interconnection fiber is simultaneously used for data transmission and powering of said switch.

18. A bypass/insert optical switch as set forth in claim 17, wherein
said fiber optic network is a dual fiber network and said station is during insert state looped into each of the fibers of said network.

19. A bypass/insert optical switch as set forth in claim 16, wherein
said fiber optic network is a dual fiber network and said station is during insert state looped into each of the two fibers of said network.

20. A GRIN-rod lens, having a parabolic refractive index distribution, for use as a fiber optic switch to which optical fibers are attached comprising:
a ferrule in which said lens is rotatable, said ferrule serving as a bearing and providing alignment of said fibers;
actuator means for rotating said lens;
where said lens has a refractive index distribution substantially equal to $n(r) = n_a(1 - Ar^2/2)$, wherein $n_a$ is the refractive index along the longitudinal axis of said GRIN-rod lens, has a length $L_1 = \pi/\sqrt{A}$, wherein A is said positive constant, and has a first and a second end facet disposed perpendicular to the longitudinal axis, and
an integrated planar mirror located in the center of the GRIN-rod lens at a position substantially at $L_1/2$, disposed perpendicular to said first and second end facet and parallel to the longitudinal axis of the GRIN-rod lens, and disposed such that different fiber links are established by rotating the GRIN-rod lens around its longitudinal axis, and thereby changing the position of the GRIN-rod lens with mirror relative to the position of said fibers.

21. A GRIN-rod lens as set forth in claim 20, wherein said mirror comprises an evaporated aluminum layer.

22. A GRIN-rod lens as set forth in claim 21, wherein said actuator means comprises a shape memory alloy wire fixed via a lever to said GRIN-rod lens, and coated with an insulation layer and a resistive layer, the resistive layer being connected via a metal bridge to a first end of said wire, disposed such that said actuator means moves from one position to another position responsive to an electric current from a current source to a second end of the wire such that the current flows through said wire and via said metal bridge and said resistive layer back to the current source.

23. A GRIN-rod lens as set forth in claim 20, wherein said GRIN-rod lens comprises two half-sections and said mirror is formed by a gap between said two half-sections.

24. A GRIN-rod lens as set forth in claim 23, wherein said actuator means comprises a shape memory alloy wire fixed via a lever to said GRIN-rod lens, and coated with an insulation layer and a resistive layer, the resistive layer being connected via a metal bridge to a first end of said wire, disposed such that said actuator means moves from one position to another position responsive to an electric current from a current source to a second end of the wire such that the current flows through said wire and via said metal bridge and said resistive layer back to the current source.

25. A GRIN-rod lens as set forth in claim 20, wherein said actuator means comprises a shape memory alloy wire fixed via a lever to said GRIN-rod lens, and coated with an insulation layer and a resistive layer, the resistive layer being connected via a metal bridge to a first end of said wire, disposed such that said actuator means moves from one position to another position responsive to an electric current from a current source to a second end of the wire such that the current flows through said wire and via said metal bridge and said resistive layer back to the current source.

* * * * *